(12) United States Patent
Halmshaw et al.

(10) Patent No.: US 7,218,323 B1
(45) Date of Patent: May 15, 2007

(54) METHOD AND SYSTEM FOR RENDERING VOXEL DATA WHILE ADDRESSING MULTIPLE VOXEL SET INTERPENETRATION

(75) Inventors: Paul A. Halmshaw, North Vancouver (CA); Andrew C.-H. Woo, Vancouver (CA); Lev N. Gretskii, Richmond (CA); Jonathan M. Young, Vancouver (CA)

(73) Assignee: NGrain (Canada) Corporation, Vancouver (CA)

( * ) Notice: Subject to any disclaimer, the term of this patent is extended or adjusted under 35 U.S.C. 154(b) by 460 days.

(21) Appl. No.: 10/918,024

(22) Filed: Aug. 13, 2004

(51) Int. Cl.
*G06T 17/00* (2006.01)
(52) U.S. Cl. ..................................... 345/424
(58) Field of Classification Search ................ 345/424
See application file for complete search history.

(56) References Cited

U.S. PATENT DOCUMENTS

| | | | |
|---|---|---|---|
| 6,714,222 B1 * | 3/2004 | Bjorn et al. | 715/839 |
| 6,867,774 B1 * | 3/2005 | Halmshaw et al. | 345/424 |
| 7,050,054 B2 * | 5/2006 | Halmshaw | 345/424 |

OTHER PUBLICATIONS

Meagher, "Efficient Synthetic Image Generation of Arbitrary 3-D Objects", 1982, IEEE, pp. 473-478.*
Machiraju et al., "Efficient Feed-Forward Volume Rendering Techniques for Vector and Parallel Processors", 1993, ACM, pp. 699-708.*
Greene et al., "Hierarchical Z-Buffer Visibility", 1993, ACM.*
Mueller et al., "Splatting Without The Blur", 1999, IEEE, pp. 363-370.*
Swan II et al., "An Anti-Aliasing Technique for Splatting", 1997, IEEE, pp. 197-204.*
Amanatides, J., and A. Woo, "A Fast Voxel Traversal Algorithm for Ray Tracing," in G. Maréchal (ed.), *Proceedings of EUROGRAPHICS '87*, Amsterdam, The Netherlands, Aug. 1987, 6 pages.
Westover, L., "Footprint Evaluation for Volume Rendering," *Computer Graphics* 24(4):367-376, Aug. 1990.
Whitted, T., "An Improved Illumination Model for Shaded Display," *Communications of the ACM* 23(6):343-349, Jun. 1980.

* cited by examiner

*Primary Examiner*—Almis R. Jankus
(74) *Attorney, Agent, or Firm*—Christensen O'Connor Johnson Kindness PLLC

(57) ABSTRACT

A method is provided for rendering 3D voxel data including plural voxel sets, while eliminating artifacts that may result from the plural voxel sets colliding with each other ("voxel interpenetration"). In one aspect, the method involves an extension of the splatting approach, and uses a z-buffer associated with each pixel to indicate the z-depth of a voxel to be painted onto the pixel. According to the method, first, the z-buffer for each pixel is reset (cleared). Next, for each of the plural voxel sets, one voxel set at a time (sequentially), voxels within the voxel set are traversed until an occupied voxel is found. If a z value of the occupied voxel is less than a z value stored in the z-buffer, the z value of the occupied voxel is stored in the z-buffer and the occupied voxel is painted onto an associated pixel. Then, the next occupied voxel is considered.

21 Claims, 13 Drawing Sheets

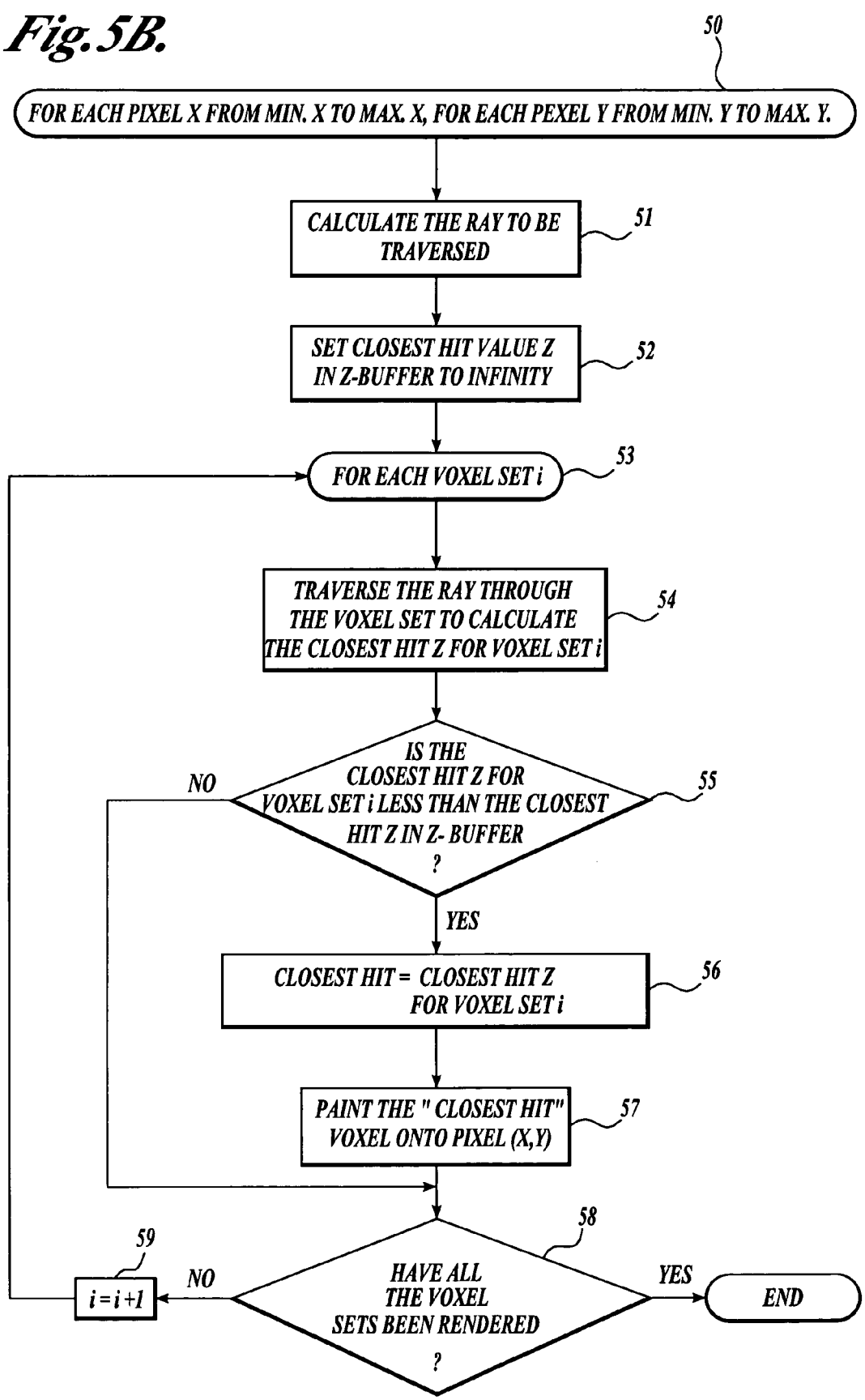

METHOD AND SYSTEM FOR RENDERING VOXEL DATA WHILE ADDRESSING MULTIPLE VOXEL SET INTERPENETRATION

FIELD OF THE INVENTION

The present invention relates generally to computer graphics rendering, and more specifically, to rendering 3D voxel data consisting of multiple voxel sets onto a view plane while eliminating artifacts that may otherwise result from the interpenetration of the voxel sets.

BACKGROUND OF THE INVENTION

Three-dimensional ("3D") digital data may be produced by a variety of devices that involve three-dimensional scanning or sampling and/or numerical modeling. For example, computed tomography (CT) and magnetic resonance imaging (MRI) devices scan portions of the human body and generate image slices of the body, which when combined or stacked, generate a 3D representation of the body, including its surface and internal volume.

Volume graphics represent a promising way to achieve the degree of realism required for high quality 3D simulations and visualization applications because volume models can contain all the surface and internal characteristics of a real object. This is in contrast to, for example, polygon-based graphics, which contain only the information about the surfaces of a 3D object. In the case of volume graphics, volume elements (i.e., "voxels") are the base data used to represent 3D objects. Typically, voxels are simply pixels that have a third coordinate z in addition to x and y coordinates in a Cartesian coordinate system (though voxels may take various other forms, also). In other words, voxels are equally sized cubes that form a discretely defined 3D space. A typical voxel-based 3D scene can consist of one or more "voxel sets", each of which in turn consists of one or more voxels. For example, the 3D scene may include one or more sets of MRI slices, each forming a voxel set, which in turn includes a plurality of voxels within each voxel set.

3D voxel data are rendered to produce a 2D image on a suitable output device, such as a video display or a printer. As used herein, the term "render" means to produce a 2D graphics image on an output device from a 3D voxel data file, and typically involves creating an image using color, texture, etc., to give the image a realistic look. In typical applications of voxel-based technologies, only one voxel set is rendered, or one voxel set is rendered independently from any other voxel sets. For example, in medical MRI applications, only a single voxel set representing a single MRI slice (or a single collection of MRI slices) is rendered at a time.

In other applications, such as in rendering voxel data produced using software available from NGRAIN Corp. of Vancouver B.C., Canada, it is often necessary to render (sometimes a large number of) multiple voxel sets at a time. Briefly, NGRAIN® technology permits 3D modeling of an object, wherein each of multiple parts or layers forming the object can be represented as a voxel set each consisting of one or more voxels. Thus, according to NGRAIN® technology, it is possible to manipulate each part or layer independently from each other or from the object as a whole, in 3D space, such as to create an exploded view of the object to show the details of its parts, or to peel off an outer layer of the object to reveal its inner layer. Various details of NGRAIN® technology are described in commonly owned Patent Cooperation Treaty Application Serial No. PCT/CA01/01010 (Publication No. WO 02/07088A2) entitled "LIGHTING ADJUSTMENT METHODS AND APPARATUS FOR VOXEL DATA," commonly owned Patent Cooperation Treaty Application Serial No. PCT/CA01/00997 (Publication No. WO 02/07089A2) entitled "APPARATUS AND METHOD FOR ASSOCIATING VOXEL INFORMATION WITH DISPLAY POSITIONS," and in commonly owned Patent Cooperation Treaty Application Serial No. PCT/CA01/00686 (Publication No. WO 02/07097A1) entitled "METHOD, APPARATUS, SIGNALS AND CODES FOR ESTABLISHING AND USING DATA STRUCTURE FOR STORING VOXEL INFORMATION," which are all specifically incorporated herein by reference. Additional details of NGRAIN® technology can also be found in an article, "Myths and Truths of Interactive Volume Graphics", a paper that has been submitted to I/ITSEC 2004 Conference.

FIG. 1 illustrates an object 10 in the form of an airplane, which consists of three voxel sets A, B, and C. Although FIG. 1 is illustrated in 2D for the purpose of clarity, it should be appreciated by one skilled in the art that the actual voxel sets A, B, C are present in 3D space. In the illustrated example, voxel set A represents the body of an airplane, while voxel sets B and C represent the two wings of the airplane, respectively. Each voxel within a voxel set is defined by its geometric location, for example, in (x, y, z) in Cartesian coordinate system. Each voxel is associated with a set of attributes, such as its shade information including color and alpha values, normal vector, texture, part/layer number (i.e., to which voxel set it belongs), etc. Voxels that are occupied by an object are termed occupied voxels, whereas voxels that are not occupied are termed empty voxels. Each voxel set may contain occupied voxels and/or empty voxels. In typical surface-based applications, where only the surfaces of an object are represented in voxels, each voxel set may be up to about 90% empty, while in volume-based applications, where an object including its internal structure is represented in voxels, each voxel set may contain a lesser percentage of empty voxels. In the example of FIG. 1, which shows an airplane object 10 in surface-based voxel model, only those voxels 8 that generally define the surfaces of the object 10 are occupied, while a majority of the voxels 9 within each voxel set (A, B, or C) are empty.

FIG. 2 illustrates three voxel sets A, B, and C, which may be considered as corresponding to voxel sets A, B, and C of the airplane object 10 shown in FIG. 1. Again, although voxel sets A, B, and C are illustrated in 2D for the purpose of clarity, it should be appreciated by one skilled in the art that the actual voxel sets are in 3D space.

Typically, multiple voxel sets are rendered sequentially one after another, because each voxel set constitutes a discrete unit (e.g., a part or layer) for the purpose of various manipulations, as described above. The order in which voxel sets are to be rendered may be determined in various ways. One example is to take the midpoint of each voxel set and sort the voxel sets based on the locations of the midpoints from the closest to the farthest away from the view point 25 (or orthographically from the viewport 26). As used herein, a viewport means a view of an image. For example, in FIG. 2, voxel sets A, B, and C have midpoints 20, 22, and 24, respectively, and the midpoints 20, 22, and 24 are distanced farther away from the viewport 26 in this order. Thus, in rendering, voxel set A is rendered first, then voxel set B, and then finally voxel set C.

If a pixel in the viewport 26 has already been fully painted by the front-most voxel set(s), then no more painting of this pixel is necessary from any farther-back voxel sets. In cases where voxel sets are far apart from each other and therefore one voxel set will always appear to be in front of another voxel set as seen from the viewport 26, as shown in FIG. 2, such rendering scheme does not create any significant rendering error. For example, as shown in FIG. 2, after the front-most voxel set A is rendered to paint the pixel set A' on the viewport 26, voxel set B is rendered to paint the pixel set B', then voxel set C is rendered to paint the pixel set C', creating an image as seen from the viewport 26. The above example is simplified by assuming that all the voxels in voxel sets A, B, and C are occupied, in order to illustrate the order of rendering and regions painted—the typical occupied and unoccupied voxel scenario is elaborated below.

FIG. 3 illustrates a situation where voxel sets A, B, and C are relatively closer together to collide with each other either physically or along the line of sight. This is the case of "voxel set interpenetration," wherein certain voxels in voxel set A are in front of the other voxel set B, while other voxels in the same voxel set A are behind voxel set B. As before, voxel sets A, B, and C are rendered in this order according to the locations of their respective midpoints. Thus, voxel set A is rendered to paint the pixel set A' on the viewport 26, then voxel set B is rendered to paint the pixel set B', and finally voxel set C is rendered to paint the pixel set C'. Note that a portion 26 of voxel set B and a portion 27 of voxel set C are both closer to, and therefore should be visible in the viewport 26 (assuming that these portions 26 and 27 represent occupied voxels), than portions 28 and 29 in voxel set A, respectively. Yet, because voxel set A was rendered first and thus the pixel set A' was fully painted by voxel set A, the portion 26 in voxel set B and the portion 27 in voxel set C are not rendered onto the viewport 26. This creates popping artifacts over a sequence of frames in the rendered images, because some image contents that are supposed to be behind others may unnaturally pop up to the front, or some image contents that are supposed to be in front of others may be unnaturally hidden behind others to create a hole. Thus, the voxel set interpenetration generally degrades the accuracy of the rendered image if untreated.

It should be noted that the interpenetration problem could be resolved with a suitable algorithm if it is assumed that each voxel set includes only occupied voxels. In such a case, it is algorithmically possible to always determine which voxels in voxel set A are in front of voxel set B based on the geometry of the voxel sets. It is often the case, however, that each voxel set contains both occupied voxels and unoccupied voxels, as illustrated in the case of the surface-based voxel model of an airplane object in FIG. 1. In a typical surface-based application, a voxel set may be up to about 90% empty, with only about 10% of voxels actually being occupied. If some voxels are empty, while other voxels within the same voxel set are occupied, then those empty voxels do not obstruct any view even if they are geometrically closer to the viewport, and therefore there is no need to consider empty voxels at all in rendering an image.

Accordingly, a need exists for a method and system that are capable of differentiating between occupied and empty voxels within each voxel set and dealing only with occupied voxels so as to address the interpenetration problem.

SUMMARY OF THE INVENTION

The present invention offers a method, system, and computer-readable medium for rendering 3D voxel data, including plural voxel sets each containing a mixture of both occupied and empty voxels, while eliminating the voxel interpenetration problem.

According to one aspect of the present invention, a method of image rendering involves an extension of the so-called splatting approach. Splatting is described, for example, in L. Westover, "Footprint Evaluation for Volume Rendering", SIGGRAPH Conference Proceedings, 24(4), pp. 367–376, August 1990, and E. Catmull. A Subdivision Algorithm for Computer Display of Curved Surfaces. Ph.D. Thesis, Univ. Utah, Salt Lake City, Utah, December 1974. Tech. Rep. UTECCSc-74-133. Briefly, splatting involves projecting each voxel in a 3D voxel set onto one or more pixels, which are arranged in a 2D array on a viewport plane. Each of the pixels on the viewport is associated with a z buffer (or more precisely, a buffer cell) that stores the z value (or "z-depth" as orthographically viewed from the viewport) of a voxel that is to be painted onto the pixel. According to the method, first, the z-buffer for each pixel is reset (cleared). Next, for each of the plural voxel sets, one voxel set at a time (sequentially), voxels within the voxel set are traversed, in front-to-back order, until an occupied voxel is found. If a z value of the occupied voxel is less than a z value stored in the z-buffer, the z value of the occupied voxel is stored in the z-buffer and the occupied voxel is painted onto an associated pixel. Then, the next occupied voxel within the same voxel is considered and treated in the same manner, until all voxels in the voxel set have been considered and treated (i.e., rendered). Then, the next voxel set will be rendered, until all the voxel sets are rendered.

The use of the z-buffer in rendering 3D voxel data permits keeping track of the truly closest, and therefore truly visible voxels amongst plural voxel sets. In other words, the z-buffer is used to resolve any conflict amongst plural voxel sets to identify which of the front-most voxels in plural voxel sets is truly visible per pixel. Accordingly, a method of the present invention ensures that only the truly visible voxels are painted onto the viewport, regardless of any interpenetration among plural voxel sets and also regardless of the particular order in which plural voxel sets are rendered.

For optimum computational efficiency, however, according to one aspect of the present invention, the plural voxel sets are initially sorted into an order of presumably closest to the viewport to presumably farthest away from the viewport. In one example, this sorting may be carried out based on the locations of the midpoints of these plural voxel sets.

According to a further aspect of the present invention, a method of rendering 3D voxel data using the (extended) splatting approach deals with voxels in each voxel set in an orderly, front-to-back order, and thus accesses the voxels as stored in contiguous memory locations. Because of the orderly access to contiguous memory locations, the splatting approach is very fast and well suited for most real-time rendering applications. In particular, according to a still further aspect of the present invention using the splatting approach, a z value of the occupied voxel may be calculated on the fly using a relatively simple equation that increments a predefined fixed value. Further, a z value of the occupied voxel may be calculated in fixed point math (as opposed to in floating point math).

According to a further aspect of the present invention, each of the pixels of the viewport is further associated with an occupancy buffer that indicates whether the associated pixel has been painted or not. When rendering plural voxel sets one at a time as described above, the occupancy buffer may be cleared at the beginning of rendering each voxel set. Then, during voxel traversing, even if an occupied voxel is found, if the occupancy buffer indicates that a pixel associated with the occupied voxel has already been painted, the occupied voxel can be discarded as irrelevant to the present rendering (i.e., other voxel(s) within the same voxel set lie in front of the occupied voxel). In other words, only if the occupancy buffer indicates that a pixel associated with the occupied voxel has not been painted, and if a z value of the occupied voxel is less than a z value stored in the z-buffer, then, the z value of the occupied voxel is stored in the z-buffer and the occupied voxel is painted onto the associated pixel. Therefore, the use of the occupancy buffer optimizes the computational efficiency by keeping track of the closest, and therefore visible voxels within each voxel set. Z-buffer accesses and comparisons are reduced because the front-to-back traversal prevents the farther back voxels within each voxel set from requiring any extra work to deal with voxel interpenetration.

According to yet another aspect of the present invention, one or more subroutines may be used to minimize aliasing (jaggedness) of a rendered image. One anti-aliasing subroutine entails "super sampling." Briefly, super sampling involves generally four steps. First, each pixel on the viewport is virtually divided into 2×2 or more virtual subpixels. Second, shading information (including color and alpha values, for example) of the occupied voxel to be projected onto each of the virtual subpixels is calculated, respectively. Third, the shading information for the two or more virtual subpixels is averaged or otherwise generalized to obtain a single piece of shading information for the original pixel. Fourth, the obtained shading information is used to paint the pixel. In essence, this approach entails up-sampling the shade information with respect to higher-resolution virtual subpixels, and then down-sampling the shade information calculated for each of the virtual subpixels to obtain a single piece of shade information for the original pixel.

Another anti-aliasing subroutine involves "alpha blending," including generally three steps. First, the front-most voxels of two voxel sets, respectively, are identified relative to each pixel. Second, the alpha values of the two front-most voxels are blended. Third, the blended alpha value is used to paint the associated pixel.

Any of the anti-aliasing subroutines may be used either alone, or in any combination, to produce a visually appealing, anti-aliased image.

The present invention further offers a computer-readable medium and also a system for rendering 3D voxel data including plural voxel sets, using a z-buffer, generally corresponding to a method of rendering 3D voxel data as described above.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 5B is a flow chart illustrating a ray tracing method to address the voxel set interpenetration problem;

DETAILED DESCRIPTION OF THE PRESENT INVENTION

Figure 1:
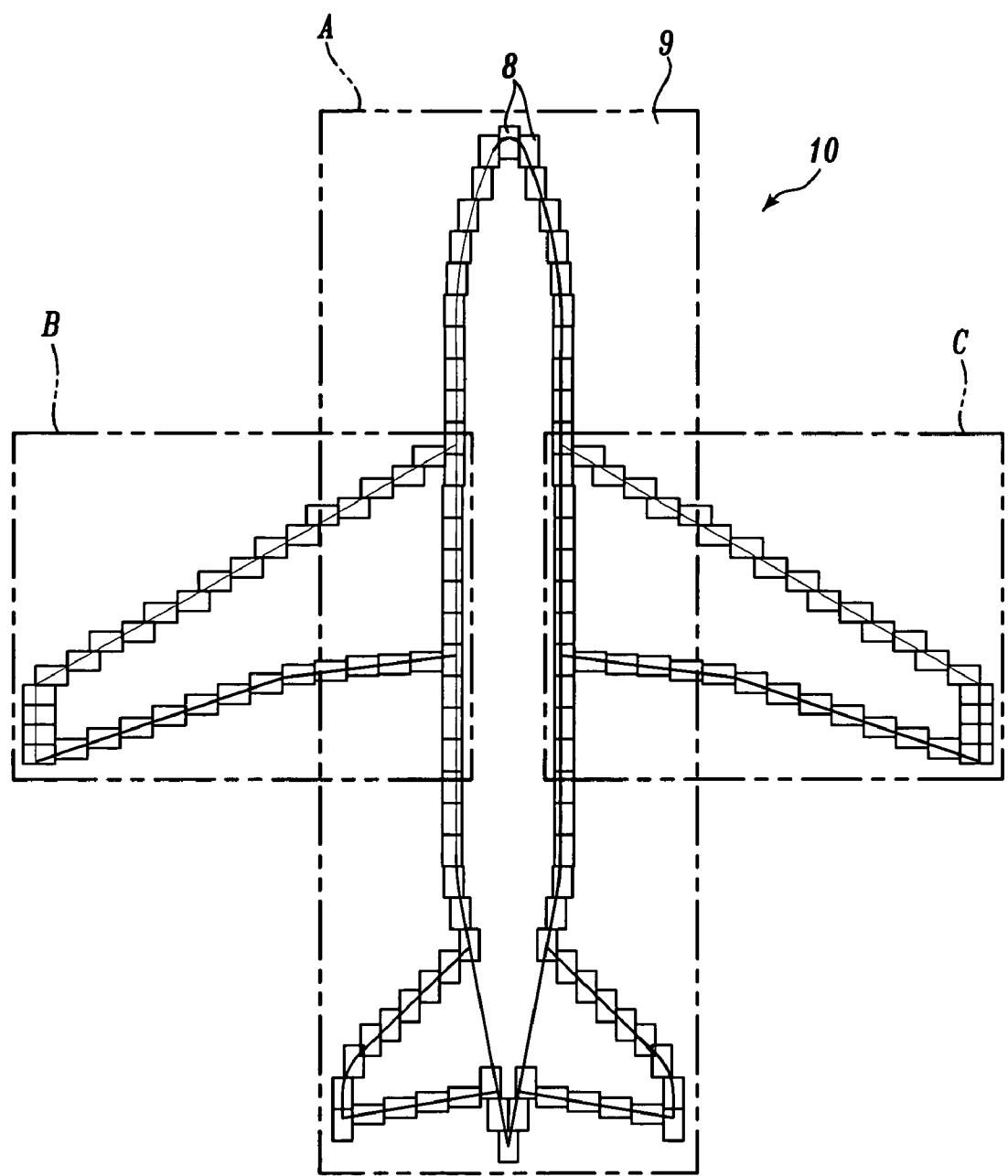
FIG. 1 is a schematic view of an object (an airplane in this example) represented in three voxel sets A, B, and C.
Figure 2:
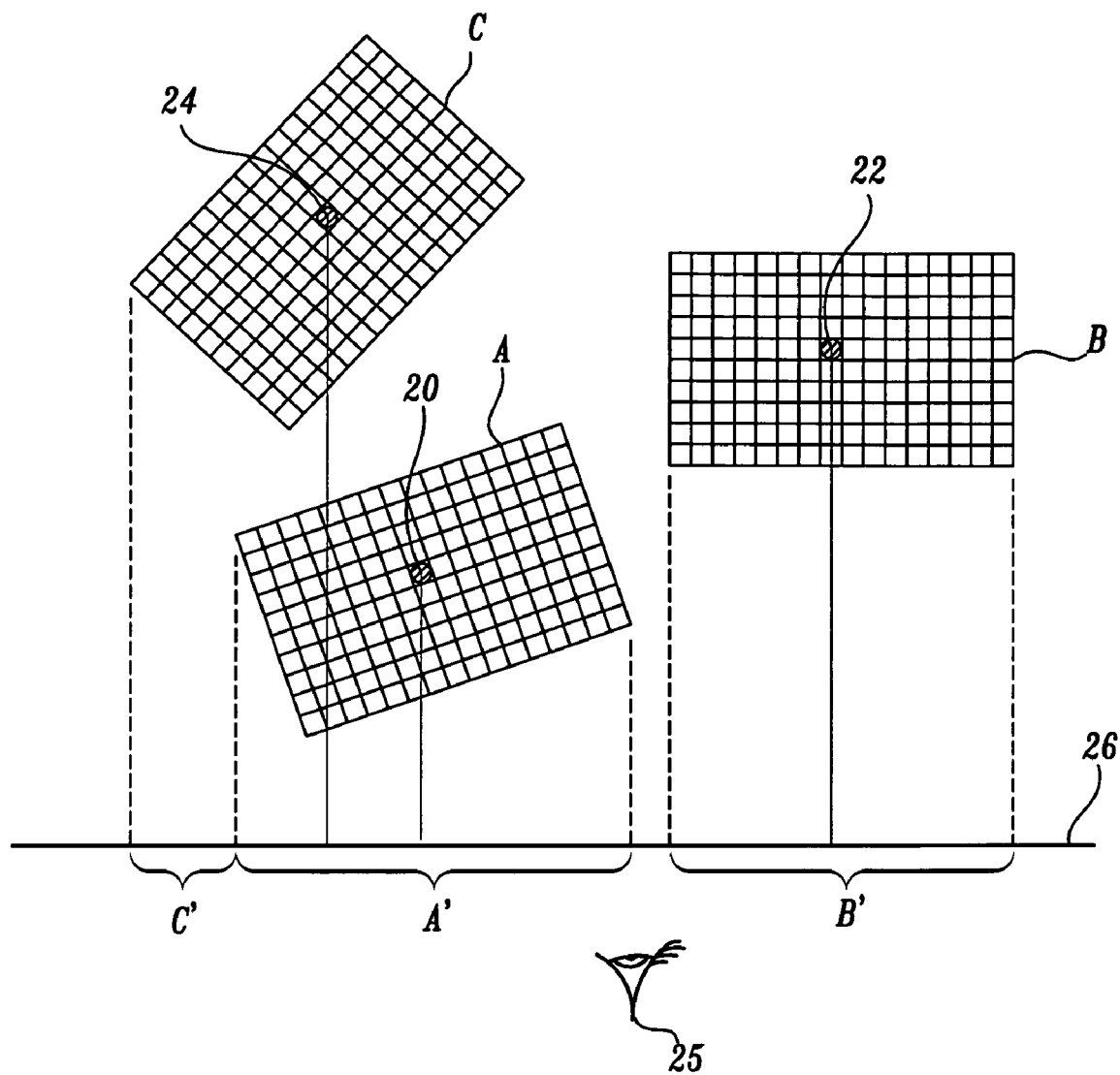
FIG. 2 illustrates three voxel sets A, B, and C, which are relatively far apart so as not to present a voxel set interpenetration problem.
Figure 3:
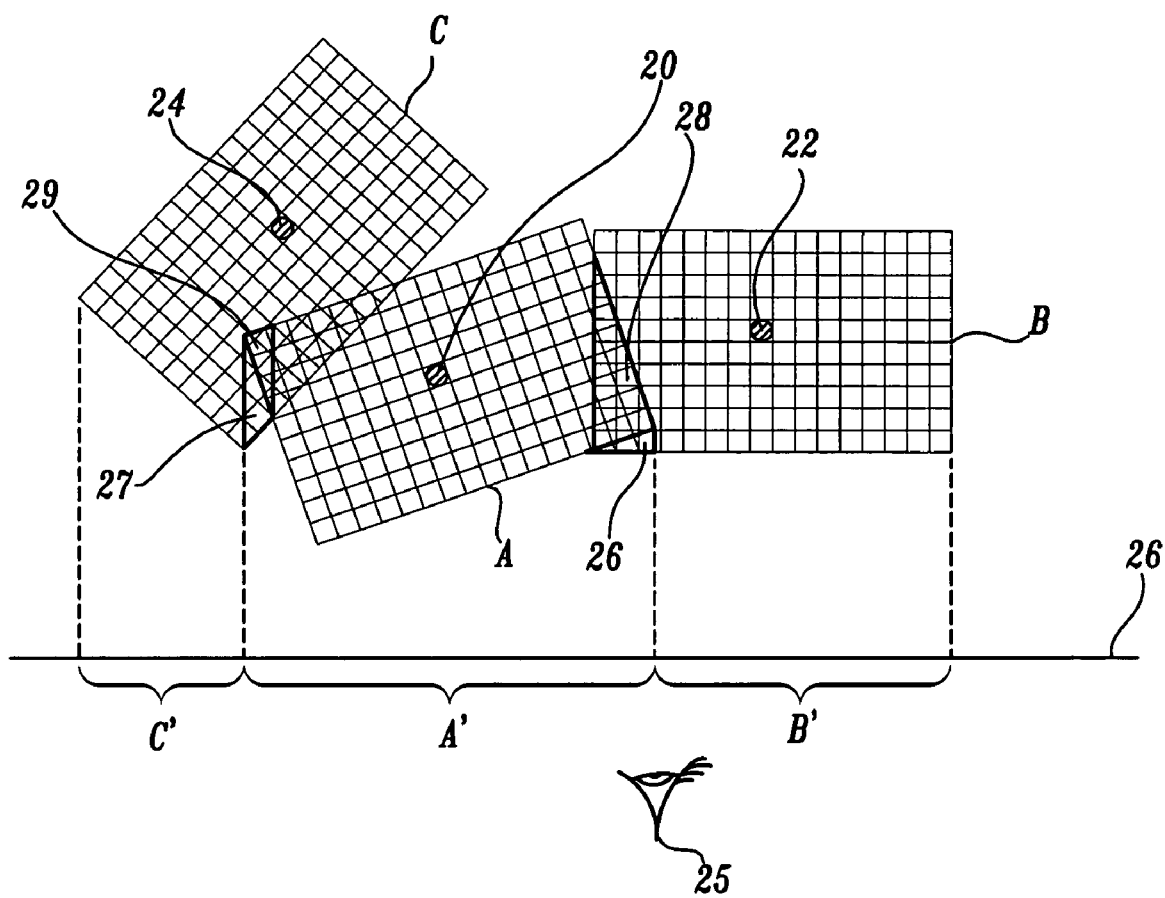
FIG. 3 illustrates voxel sets A, B, and C, which collide with each other physically or along the line of sight so as to create a voxel set interpenetration problem.
Figure 4:
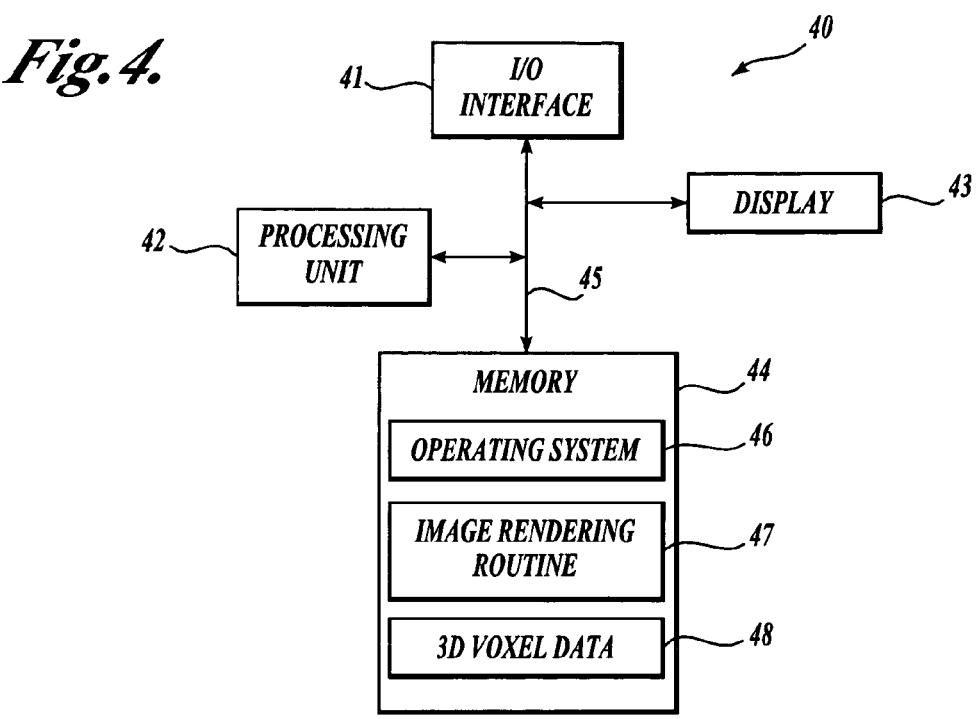
FIG. 4 is a block diagram of several components of a computing device that are used to render 3D voxel data to a 2D image, suitable for use in implementing a method of the present invention.

FIG. 4 depicts several of the key components of a computing device 40 that may be used to render 3D voxel data into a realistic 2D image while addressing the voxel set interpenetration problem, according to one aspect of the present invention. Those skilled in the art will appreciate that the computing device 40 may include many more components than those shown in FIG. 4. However, it is not necessary that all of these generally conventional components be shown in order to disclose an enabling embodiment for practicing the invention. As shown in FIG. 4, the computing device 40 includes an input/output ("I/O") interface 41 for connecting to other devices, such as 3D data collection devices. The I/O interface 41 includes the necessary circuitry for such a connection and is constructed for use with the necessary protocols, as will be appreciated by one skilled in the art.

The computing device 40 also includes a processing unit 42, a display 43, and a memory 44 all interconnected along with the I/O interface 41 via a bus 45. The memory 44 generally comprises a random access memory ("RAM"), a read-only memory ("ROM"), and a permanent mass storage device, such as a disk drive, tape drive, optical drive, floppy disk drive, or combination thereof. The memory 44 stores an operating system 46, an image rendering routine 47 for rendering 3D voxel data to a 2D image, and a database 48 for storing the 3D voxel data to be rendered. In one embodiment of the present invention, the image rendering routine 47 may include routines and techniques disclosed in commonly owned PCT/CA01/01010 (WO 02/07088A2) and PCT/CA01/00997 (WO 02/07089A2) incorporated above. The present invention is generally directed to further optimizing the rendering routines and techniques to address the voxel set interpenetration problem discussed above.

It will be appreciated that any of the software components may be loaded from a computer-readable medium into memory 44 of the computing device 40 using a drive mechanism (not shown) associated with the computer-readable medium, such as a floppy drive, tape drive, or DVD/CD-ROM drive, or via the I/O interface 41.

Although an exemplary computing device 40 has been described that generally conforms to a conventional general purpose computing device, those skilled in the art will appreciate that a computing device 40 may be of any of a great number of devices capable of rendering 3D voxel data into a 2D image. However, in at least one embodiment of the present invention, the computing device 40 does not require specialized hardware. Rather a standard processor as used in a typical laptop, desktop computer or PDA, is sufficient. Further, a constrained memory, i.e., a limited amount of memory relative to a typical computer graphics rendering system, is sufficient. Neither specialized hardware nor a significantly large amount of memory is necessary because the voxel data are stored in memory in a data structure that facilitates fast retrieval, storage, deletion, and rendering of voxels. Such a data structure is described in commonly owned PCT/CA01/00686 (WO 02/07097A1) incorporated above. Accordingly, in one embodiment of the present invention, the computing device 40 requires only 512 megabytes of RAM and a 700 megahertz Intel® Pentium®III processor or an equivalent thereof.

As described above in the background section, a need exists for a method of addressing the voxel interpenetration problem, which is capable of differentiating between occupied and empty voxels within each voxel set and dealing only with occupied voxels. One such method may employ the well-known ray tracing approach.

Figure 5A:
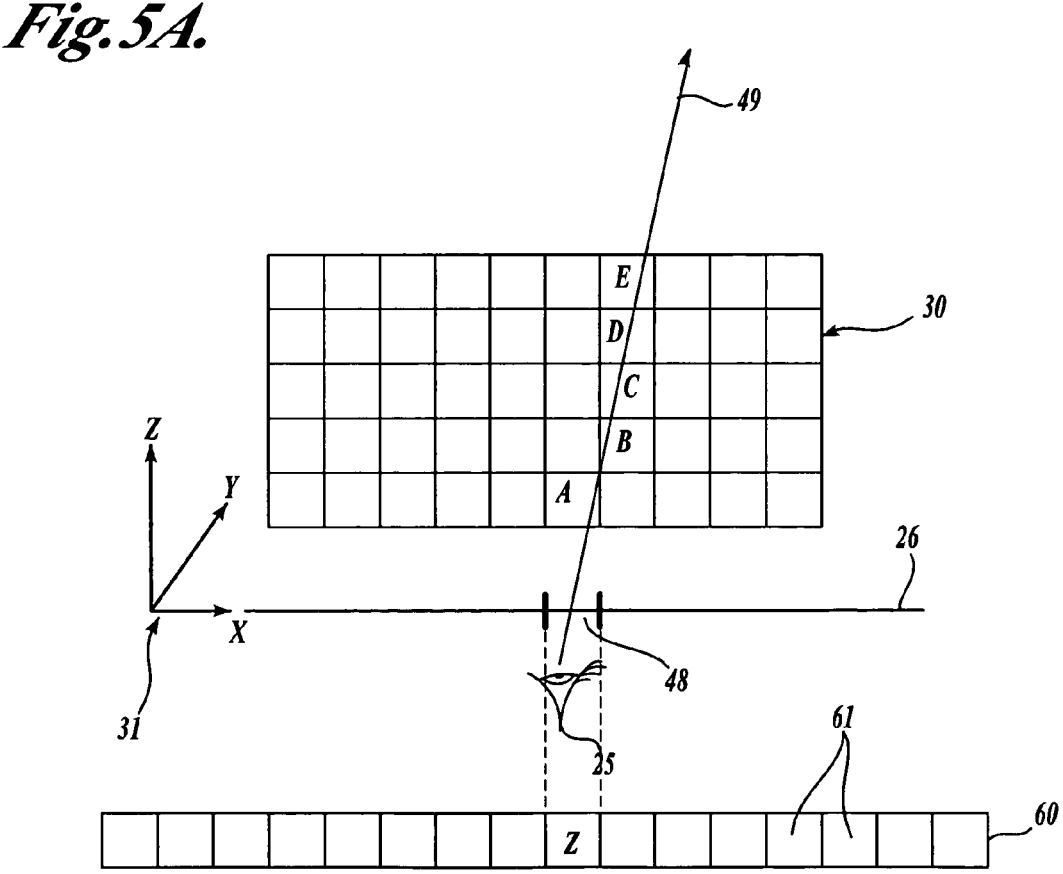
FIG. 5A illustrates a ray tracing method, which may be used to address the voxel set interpenetration problem.

Ray tracing is a sophisticated and complex method of producing high-quality computer graphics, well known amongst those skilled in the art. Referring to FIG. 5A, for each pixel 48, a ray 49 is shot from the view point 25 through the viewport 26 and the ray 49 traverses through voxels A, B, C, D, and E, in this order, within the voxel set 30. The ray traversal halts if any of the traversed voxels is occupied. Then, the first-traversed occupied voxel is selected as the visible voxel and its shade (including color and alpha) is painted onto the corresponding pixel. In the example of FIG. 4A, if voxels A and B are empty and voxels C, D, and E are occupied, the first-traversed occupied voxel C is selected and painted onto the pixel 48.

The ray tracing method can be applied in the context involving multiple voxel sets to address the voxel set interpenetration problem, according to the flowchart of FIG. 5B. For each pixel in the viewport 26, i.e., for each pixel x from minimum x to maximum x, for each pixel y from minimum y to maximum y (step 50), first, the ray to be traversed is calculated (step 51). In step 52, the "closest hit" value z in a z-buffer is initially set to infinity. As shown in FIG. 5A, each pixel in the viewport 26 is associated with a z-buffer 60 (or more precisely, each pixel is associated with each z-buffer cell 61 within the z-buffer 60) that stores a z value of a voxel to be painted onto the pixel. As also shown in FIG. 5A, axis z in view-space coordinates 31 extends perpendicularly from the viewport 26 toward the voxel set 30, and thus the z value of a voxel generally indicates the distance or "depth" of the voxel relative to the viewport 26. As used herein, the "closest hit" value z means the value z of an occupied voxel that is first traversed along a tracing ray (and thus is visible to the viewport 26 and the view point 25).

As described above, preferably, multiple voxel sets are first sorted in the order of presumed closest to the farthest away from the viewport 26, for example based on the locations of their respective midpoints, so as to optimize the computational efficiency during rendering. Then, for each voxel set i (step 53), the ray is traversed through the voxel set i to calculate the closest hit value z for the voxel set, i.e., the z value of the first-traversed occupied voxel within the voxel set (step 54). In step 55, it is determined whether the closest hit value z calculated for the current voxel set is less than the closest hit value z as stored in the z-buffer 60 (and initially set to infinity). If so, in step 56, the closest hit value z for the current voxel set becomes the closest hit value z stored in the z-buffer 60. If not, the z value in the z-buffer 60 remains unchanged. In step 57, the "closest hit" (or visible) voxel in the current voxel set is painted onto the associated pixel (x,y). In step 58, it is determined whether all voxel sets (assuming that multiple voxel sets are to be rendered) have been rendered. If not, in step 59, i is incremented by 1, and returning to step 53, the ray tracing routine is repeated to find the closest hit value z for the new voxel set. Note that, in step 55, if the closest hit value z for the second voxel set happens to be less than the closest hit value z in the z-buffer (e.g., the closest hit value z for the first voxel set), then in step 56, the closest hit value z for the second voxel set becomes the closest hit value z to be stored in the z-buffer. Thereafter, in step 57, the "closest hit" voxel in the second voxel set is painted onto the associated pixel (x,y), to perhaps paint over the closest hit voxel in the first voxel set that has already been painted onto this pixel. Thus, it is ensured that only the truly closest voxels, regardless of which voxel set they belong to, are rendered to form an image on the viewport. Once all the voxel sets have been rendered (step 58), the routine ends.

The ray tracing approach is relatively complex and computationally intensive, and accordingly is slow and not suited for most real-time applications. Therefore, particularly when real-time applications are required on a standard hardware device, a different approach is desired. Accordingly, the present invention proposes a novel approach based on, and extends, the splatting approach, which is fast and well suited for real-time applications, as will be more fully described below.

Splatting Approach

Splatting is also a well known approach in computer graphics rendering. Briefly, splatting is an object-order rendering technique, as opposed to a pixel-order rendering technique such as the tracing technique described above. In pixel-order rendering, each pixel is considered one by one and rendered (or painted) in order. In object-order rendering, on the other hand, each object, i.e., each voxel set in 3D voxel data in the present case, is considered one by one and rendered in order.

Figure 6:
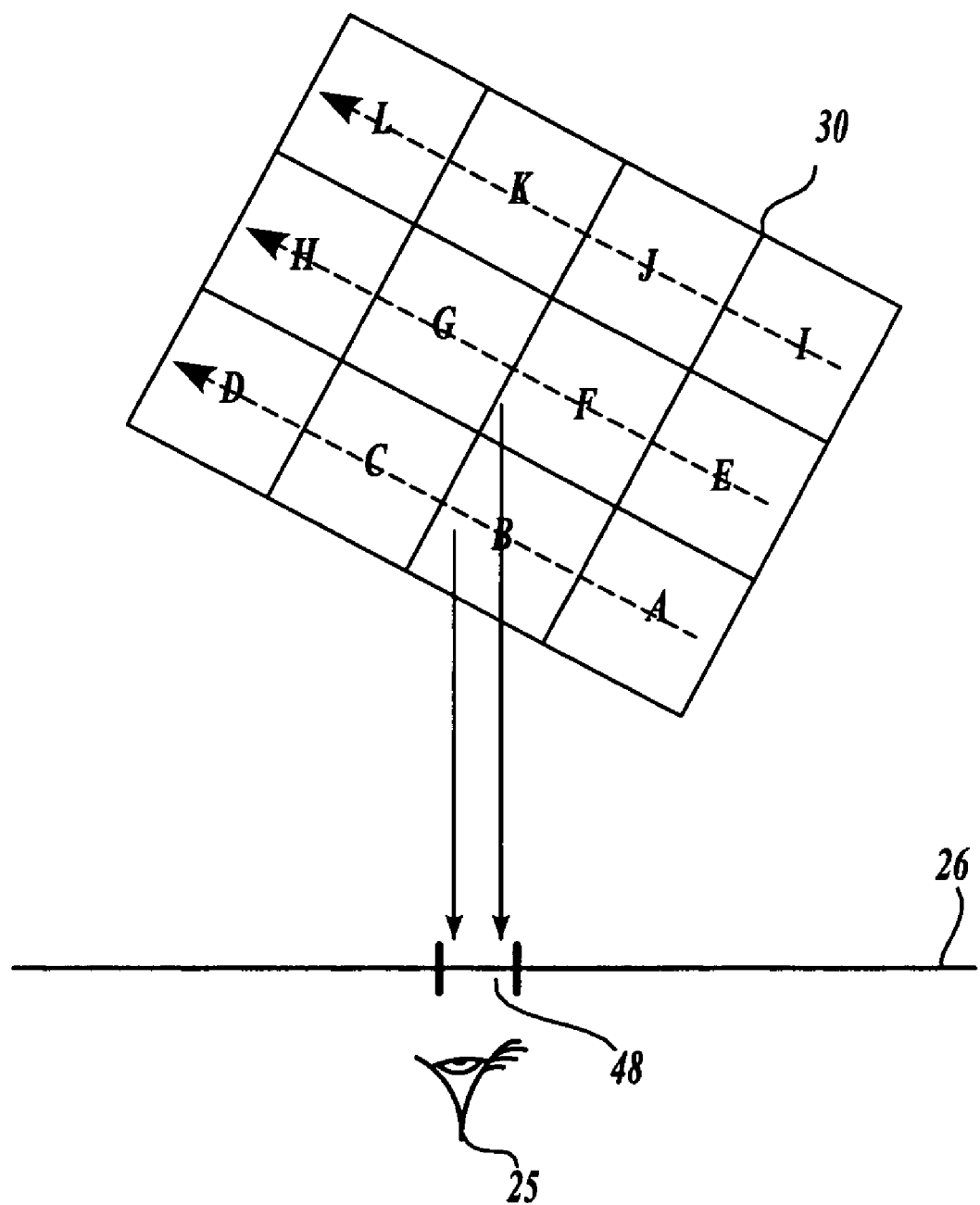
FIG. 6 illustrates a splatting method, in its general scheme, to render a 3D object onto a 2D plane.

Referring to FIG. 6, a brief description of the splatting approach in general is provided. Given a certain view point 25, voxels in a voxel set 30 are considered in a front-to-back order in the direction of broken arrows, in a memory contiguous fashion. Because of this orderly access to contiguous memory locations, the splatting approach, and more generally an object-order rendering technique, is quite fast as compared to a pixel-order rendering technique such as the ray tracing approach. In FIG. 6, the voxels are considered in order from A through L. For any voxel set, at least one front-to-back order can be readily identified, as described in detail in PCT/CA01/00997 (WO 02/07089A2) incorporated above. As the voxels are considered in a front-to-back order, for each voxel visited that is occupied, its position is projected to the relevant pixel on the viewport 26. In FIG. 6, for example, voxels B and F that are found to be occupied are projected to the pixel 48 on the viewport 26. Each pixel has an associated occupancy buffer (not shown in FIG. 6), which indicates whether or not the pixel has been painted. In one application, only when the pixel's occupancy buffer indicates that the pixel has not been painted, the occupied voxel is shaded (i.e., its shade information including color and alpha values is calculated) and painted onto the pixel using the calculated shade information, and then the occupancy buffer is marked as painted. Thus, in the example of FIG. 6, voxel B is shaded and painted onto the pixel 48, but voxel F will not be shaded nor painted, because by the time voxel F is considered, the occupancy buffer for the pixel 48 indicates that this pixel has already been painted (by voxel B).

As described above, the splatting approach deals with voxels in each voxel set in an orderly, front-to-back order, and thus accesses the voxels as stored in contiguous memory locations. Because of the orderly access to contiguous memory locations, the splatting approach is much faster than the ray tracing approach, and therefore is particularly suited for most real-time rendering applications. The present invention therefore extends the general splatting approach to the case of rendering multiple voxel sets, to provide a rendering method suitable for real-time applications while solving the voxel set interpenetration problem.

Specifically, the present invention offers a system and method of rendering multiple voxel sets using a splatting approach, characterized by using an extra z-buffer in addition to the conventional implementation suited for rendering only a single voxel set.

Figure 7:
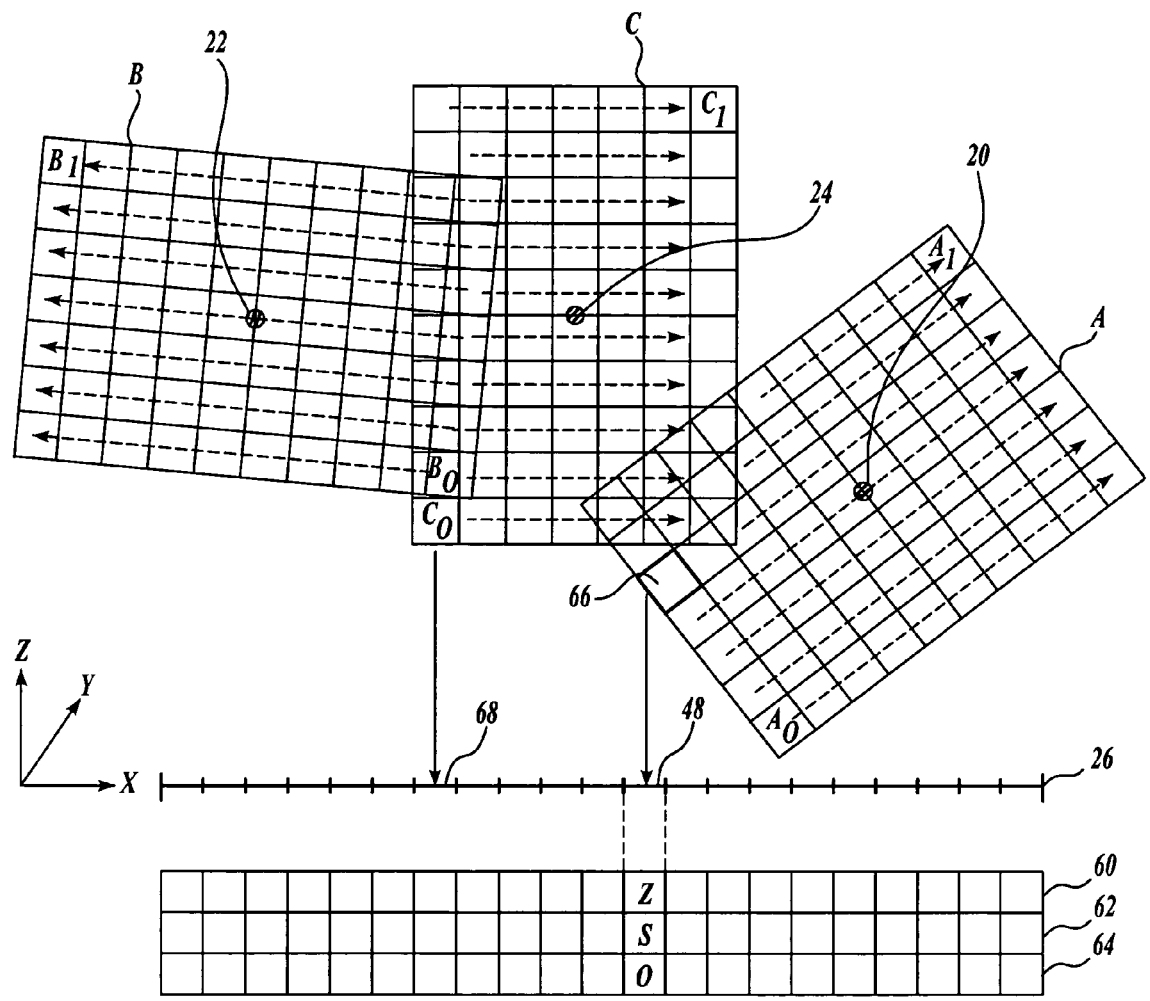
FIG. 7 illustrates three voxel sets A, B, and C, which are to be projected onto a viewport using a z-buffer, according to a method of the present invention.

FIG. 7 illustrates three voxel sets A, B, and C, which collide with each other thereby potentially creating the voxel set interpenetration problem. Each pixel (e.g., 48) in the viewport 26 is associated with three types of buffers: z-buffer 60, color buffer 62, and occupancy buffer 64. For each pixel, the z-buffer 60 stores the value z (i.e., the distance from the viewport 26) of the voxel to be painted onto that pixel. The color buffer 62 stores shade information including color and alpha values, which is calculated to indicate how the voxel should be painted (in what color, shade, etc.) onto the pixel. The occupancy buffer 64 stores information indicating whether or not the pixel has been painted. Each of the z-buffer, color-buffer, and occupancy buffer, in and of itself, is known in the art, for example in the field of polygon-based graphics rendering; however, these buffers, in particular the z-buffer, have not been employed in the field of voxel-based graphics rendering in the past.

Figure 8:
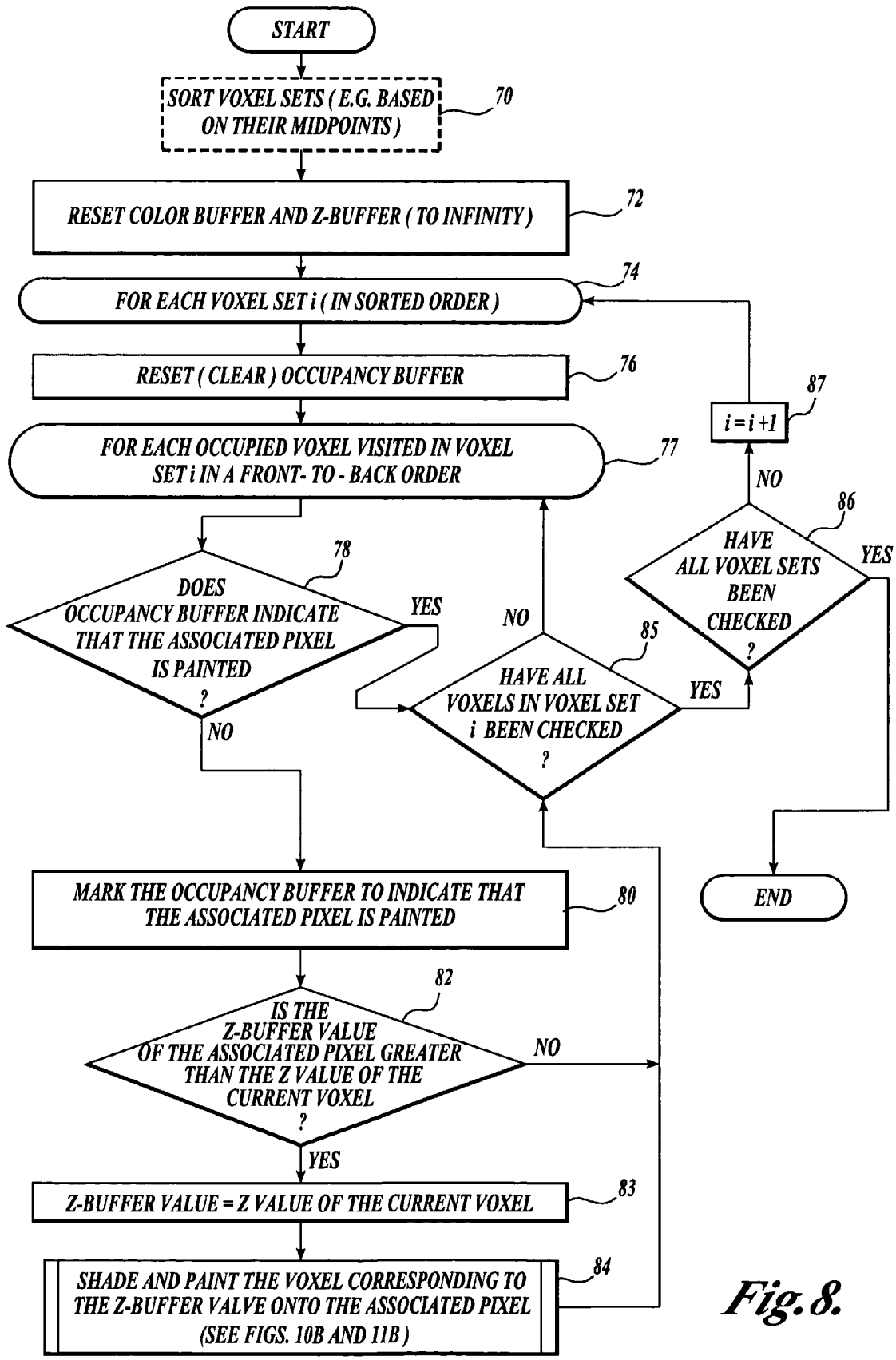
FIG. 8 is a flow chart illustrating a splatting method of rendering an image using a z-buffer to address the voxel set interpenetration problem, according to one aspect of the present invention.

FIG. 8 is a flow chart illustrating a method of rendering multiple voxel sets, such as voxel sets A, B, and C shown in FIG. 7, while eliminating the voxel set interpenetration problem. In FIG. 8, at step 70, multiple voxel sets are sorted in the order of presumably the closest to the farthest away from the viewport 26 based on various techniques, such as based on the locations of their respective midpoints, as discussed above. In the example of FIG. 7, voxel sets A, B, and C are sorted in this order because their respective midpoints 20, 22, and 24 are farther away from the viewports 26 in this order.

Other examples of determining the order in which to render multiple voxel sets include sorting voxel sets based on the locations of their points closest to the viewport (as opposed to their midpoints), or based on the locations of their points farthest away from the viewport. Any other suitable algorithm may also be used as long as it is designed to presumably sort multiple voxel sets in the order of relatively closer to farther away from the viewport.

Strictly speaking, step 70 of sorting voxel sets is optional because the present method of eliminating the voxel set interpenetration problem works, regardless of in what order the multiple voxel sets are rendered. However, for the purpose of optimal processing efficiency, it is preferred that multiple voxel sets are first sorted in the order from the most likely visible to the least likely visible—the z-buffer can then be efficiently used to eliminate occupied voxels that are already occluded and farther away.

In step 72, both the z-buffer 60 and the color buffer 62 are reset. Specifically, the z-buffer 60 is reset to INFINITY for all the pixels.

Thereafter, for each voxel set i (step 74), the occupancy buffers 64 is also reset (step 76). Thus, at this point, all of the three buffers are reset. Then, in step 77, the voxel set i is scanned in a front-to-back order, as discussed above, to identify any occupied voxels within the voxel set. Referring additionally to FIG. 7, voxel set A is scanned starting from voxel A0, in the direction of broken arrows, until the final voxel A1 is reached. As noted above, for any voxel set, at least one front-to-back order can be readily found.

For each occupied voxel visited in voxel set i, in step 78, it is determined whether the occupancy buffer 64 indicates that the associated pixel, onto which the voxel is to be projected, is painted. For example, referring to FIG. 7, if it is determined that voxel 66 in voxel set A is occupied, it is determined whether its associated pixel 48, onto which the voxel 66 is projected, has been painted by checking the occupancy buffer 64 of the pixel 48. If the pixel has not yet been painted (as in the example of the voxel 66), then proceeding to step 80, the occupancy buffer 64 for the associated pixel is marked to indicate the pixel as painted. Then, in step 82, it is determined whether the z-buffer value of the present pixel, as stored in the z-buffer 60, is greater than the value z of the current voxel (i.e., the occupied voxel traversed in voxel set i). In the present example, since the z-buffer was initially set to infinity (in step 72 above), and infinity is greater than the z value of the current voxel 66, the question posed in step 82 is answered yes, and the routine proceeds to step 83. In step 83, the z-buffer value for the associated pixel is set as the z value of the current voxel 66 (i.e., the z value of the current voxel is stored in the z-buffer 60).

Next, in step 84, the voxel corresponding to the current z-buffer value (i.e., the voxel whose z value is stored in the z-buffer 60) is shaded and painted onto the associated pixel. Therefore, in the present example, the voxel 66 is shaded and painted onto the pixel 48. Shading of a voxel involves calculating the shade information, including its color and alpha values, of the voxel using various parameters (diffuse, specular, ambient, normal, view point, light source, etc.), and is described in detail in PCT/CA01/01010 (WO 02/07088A2) incorporated above. The shade information is calculated on the fly for each voxel whose z value is stored in the z-buffer 60, and stored in the color buffer 62 for the associated pixel to be painted with the voxel. During step 84 of shading and painting, a further anti-aliasing subroutine may be performed, which will be described in detail in reference to FIGS. 10B and 11B below.

In FIG. 8, at step 85, it is determined whether all the voxels in voxel set i have been checked. If not, going back to step 77, the next occupied voxel within the voxel set i is found and the routine repeats itself.

On the other hand, if it is determined that all the voxels in voxel set i have been checked, then proceeding to step 86, it is determined whether all of the multiple voxel sets have been considered. If not, in step 87, i is incremented by 1 and the routine returns to step 74 and the next voxel set is considered. First, in step 76, the occupancy buffer 64 is cleared for this next voxel set. Then, the next voxel set, i.e., voxel set B in this example, is scanned starting from voxel B0, along the direction of broken arrows, until the final voxel B1 is reached (see FIG. 7).

After voxel set B has been considered and rendered, voxel set C is scanned starting from voxel C0, along the direction of broken arrows, until the final voxel C1 is reached. During this third iterative process, in step 82, suppose that the z-buffer value stored in the z-buffer 60 is found to be greater than the z value of the current voxel in the third voxel set C. This will be the case, for example, of a pixel 68 in FIG. 7. Because voxel set B is sorted and rendered ahead of voxel set C due to its midpoint 22 being closer to the viewport 26 than the midpoint 24 of voxel set C, the z value of voxel B0 has been stored in the z-buffer 60 for the pixel 68, and the pixel 68 has been painted with voxel B0. After voxel set B has been rendered, voxel set C is considered. Note that at the beginning of this third iteration, in step 76, the occupancy buffer 64 is again cleared. Therefore, the front-most voxel C0 in voxel set C passes the test of step 78 (whether the occupancy buffer 64 indicates the associated pixel as not painted), and is passed onto step 82 to determine whether its z value is less than the z value stored in the z-buffer 60. Since the z value of voxel C0 is less than the z value of voxel B0 stored in the z-buffer 60 at this point, in step 83, the z-buffer value is changed to the z value of the current voxel C0. Then, in step 84, voxel C0 is shaded and painted onto the associated pixel 68.

According to an embodiment of a method described above, it is ensured that only the truly visible voxels are painted onto the viewport 26, regardless of any interpenetration among multiple voxel sets and also regardless of the particular order in which multiple voxel sets are rendered. The use of the z-buffer 60 permits keeping track of the truly closest, and therefore truly visible voxels amongst multiple voxel sets. In other words, the z-buffer 60 is used to resolve any conflict amongst multiple voxel sets to identify which of the front-most voxels in multiple voxel sets is truly visible per pixel.

As noted above, the present method of eliminating the voxel set interpenetration problem works, regardless of the particular order in which the multiple voxel sets are rendered. However, for optimal efficiency, it is preferred to sort multiple voxel sets in the order from presumably the closest to the viewport to presumably the farthest away from the viewport. This will eliminate the need for having to shade and paint numerous voxels that are most likely not visible in the viewport 26.

The use of the occupancy buffer 64 is not necessarily required. However, again for the optimal efficiency, the use of the occupancy buffer 64 is preferred so as to eliminate the need for having to shade and paint irrelevant (i.e., nonvisible) voxels within each voxel set. Specifically, for each voxel set, if it is determined in step 78 of FIG. 8 that a particular pixel onto which the current voxel is to be projected has already been painted, then the current voxel is discarded and it need not be shaded nor painted. Therefore, for those voxels that are generally behind the frontal row of voxels within each voxel set, no z-value nor shade information needs to be calculated at all. Accordingly, the use of the occupancy buffer improves the computational efficiency in rendering within each voxel set (because the size of the occupancy buffer is smaller in size than the z-buffer to achieve better cache hits, and there is no need to compute z-values on the fly for those voxels). Note that the occupancy buffer 64 is reset for each voxel set i for this purpose (see step 76 of FIG. 8).

In step 82 of FIG. 8, the z value of the current voxel is compared against the z value stored in the z-buffer 60. To that end, the z value of the current voxel must be first calculated. According to one aspect of the present invention, the z value of the current voxel can be computed very quickly because all the voxels within a voxel set are checked in an orderly, front-to-back order for fixed increments in X/Y/Z directions (in voxel-space coordinates).

Figure 9:
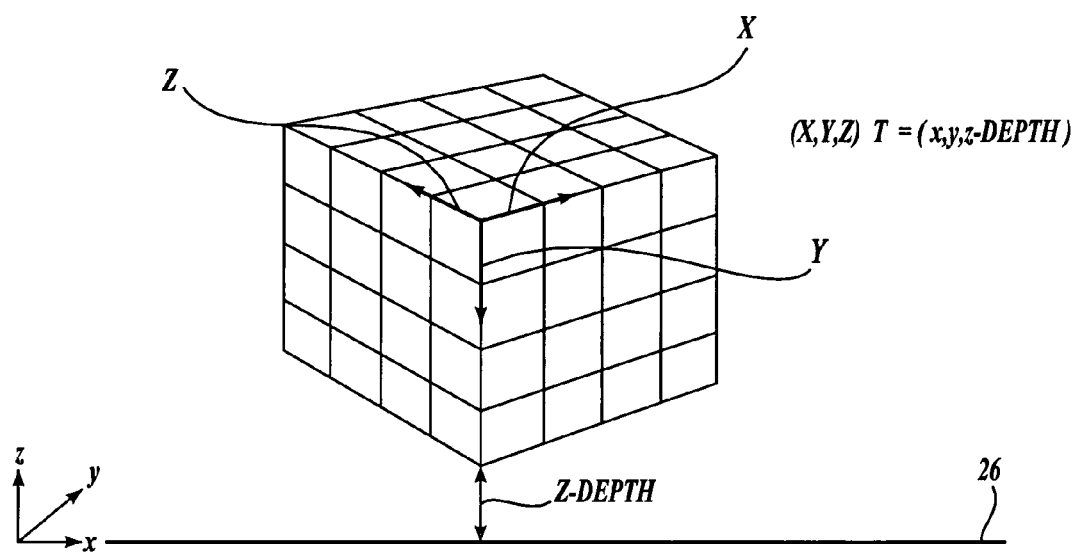
FIG. 9 illustrates the concept of transforming voxel-space coordinates (X, Y, Z) into view-space coordinates (x, y, z), thereby to calculate the z-depth of each voxel in a voxel set, for use in a method according to one aspect of the present invention.

Specifically, FIG. 9 illustrates the concept of transforming voxel-space coordinates (X, Y, Z) into view-space coordinates (x, y, z), thereby to calculate the z-depth of each voxel in a voxel set. A transform T is used to transform voxels in the voxel-space coordinates into the view-space coordinates. Any suitable transform for converting one 3D space to another, as will be apparent to one skilled in the art, may be used. Because we need to calculate only the z-depth of a voxel at issue, only the z column of the transform T is important for an orthographic view, or more precisely, T[2][0], T[2][1], T[2][2], T[2][3] (all in the z column [2] of the transform T) are important. Then, the z-depth value of a voxel can be obtained as:

$$z\text{-depth}=(X-midX)*T[2][0]+(Y-midY)*T[2][1]+(Z-midZ)*T[2][2]+T[2][3] \quad \text{Eq. (1)}$$

where X, Y, Z are the voxel coordinates, and midX, midY, midZ are the voxel resolutions halved, i.e., half the number of voxels in the voxel set along X, Y, or Z direction. (X−midX), (Y−midY), and (Z−midZ) are used so as to minimize the maximum absolute number to be multiplied with the z column of the transform T, to thereby ease the subsequent computation. Note that it is not necessary to obtain the absolute value of the z-depth of the current voxel; rather, all that is needed is the relative value of the z-depth so that the z-depth of one voxel can be compared to the z-depth of another voxel.

The above Equation (1) can be expanded into:

$$z\text{-depth}=A+B+C \quad \text{Eq. (2)}$$

where:

$A=Y*T[2][1]$ $B=X*T[2][0]+Z*T[2][2]$ $C=-midX*T[2][0]-midY*T[2][1]-midZ*T[2][2]+T[2][3]$ Note that C is constant throughout the entire voxel set, and therefore C is computed only once for each voxel set. Also, because the voxels in the voxel set are traversed in X, Z order, and then in Y order, in one implementation (as described in PCT/CA01/00686 (WO 02/07097A1) incorporated above), B is computed per X/Z column (note that there can be other orderings of traversals, for example in X, Y order first and then in Z order, but the above equations can be easily extended to each ordering as will be apparent to one skilled in the art). Accordingly, the only value that needs to be computed per voxel is A. If we let D=B+C, then z-depth per voxel is:

$$z\text{-depth}=D+Y*T[2][1] \quad \text{Eq. (3)}$$

which consists simply of an addition and a multiplication. We can further simplify the equation so that it involves only one addition, because we can pre-calculate Y*T[2][1] for all possible Y values and store them in a table having the Y-resolution size, where each index I indicates I*T[2][1]. Then, $$z\text{-depth} = D + \text{tableLookup}(Y) \quad \text{Eq. (4)}$$

which involves only one addition. Thus, the z value for the current voxel set can be computed very quickly, which further improves the overall efficiency of the rendering scheme described above.

As one skilled in the art will appreciate, computations in floating point coordinates are generally more burdensome than computations in fixed point coordinates. Therefore, according to a further aspect of the present invention, the computation of the z value for the current voxel is carried out in fixed point coordinates, for example, 16-bit fixed point math. To that end:

$$T[2][j] = (\text{short})(T[2][j] * \text{BIG\_NUMBER}), \text{ for } j = 0 \ldots 3. \quad \text{Eq. (5)}$$

Essentially, the above equation multiplies the transform T with a large constant (BIG_NUMBER), so that all the computations and z-value comparisons will be in fixed point math, which tends to perform faster than floating point math.

Note that this operation needs to be done only once per rendering. Once T[2][0], T[2][1], T[2][2], and T[2][3] are calculated according to Equation (5), the z-depth of the current voxel may be readily calculated using Equations (1)–(4) above, but in fixed point coordinates as opposed to in floating point coordinates.

While the above discussion describes a method of rapidly computing z-values in orthographic views, z-values can be calculated quickly for perspective views also.

Anti-Aliasing

In some cases, the above-described interpenetration method may produce aliased results or jaggedness in the rendered image, mostly due to the fact that each pixel typically has only one occupancy buffer cell and color buffer cell associated with it (and thus there is no means to store subpixel-level information.) To address the aliasing problem, it is possible to employ a higher resolution set of occupancy buffer and color buffer, i.e., to provide two or more occupancy/color buffers per pixel. However, increasing the resolution of buffers generally increases the computational intensity for supporting such buffers, and therefore the resulting method tends to be relatively slow. Accordingly, the present invention offers several approaches for addressing the aliasing issue: super sampling approach and alpha blending approach. Note, however, that due to the innovative preprocessing done for the shading (as discussed in PCT/CA01/01010 (WO 02/07088A2) incorporated above, the extra subpixel information does not incur extra cost for shading and lighting.

The first approach is super sampling, i.e., first dividing each pixel into plural virtual subpixels to calculate subpixel-level shade information, and then averaging the shade information for all of the virtual subpixels to obtain a single piece of shade information for the original (undivided) pixel.

Figure 10A:
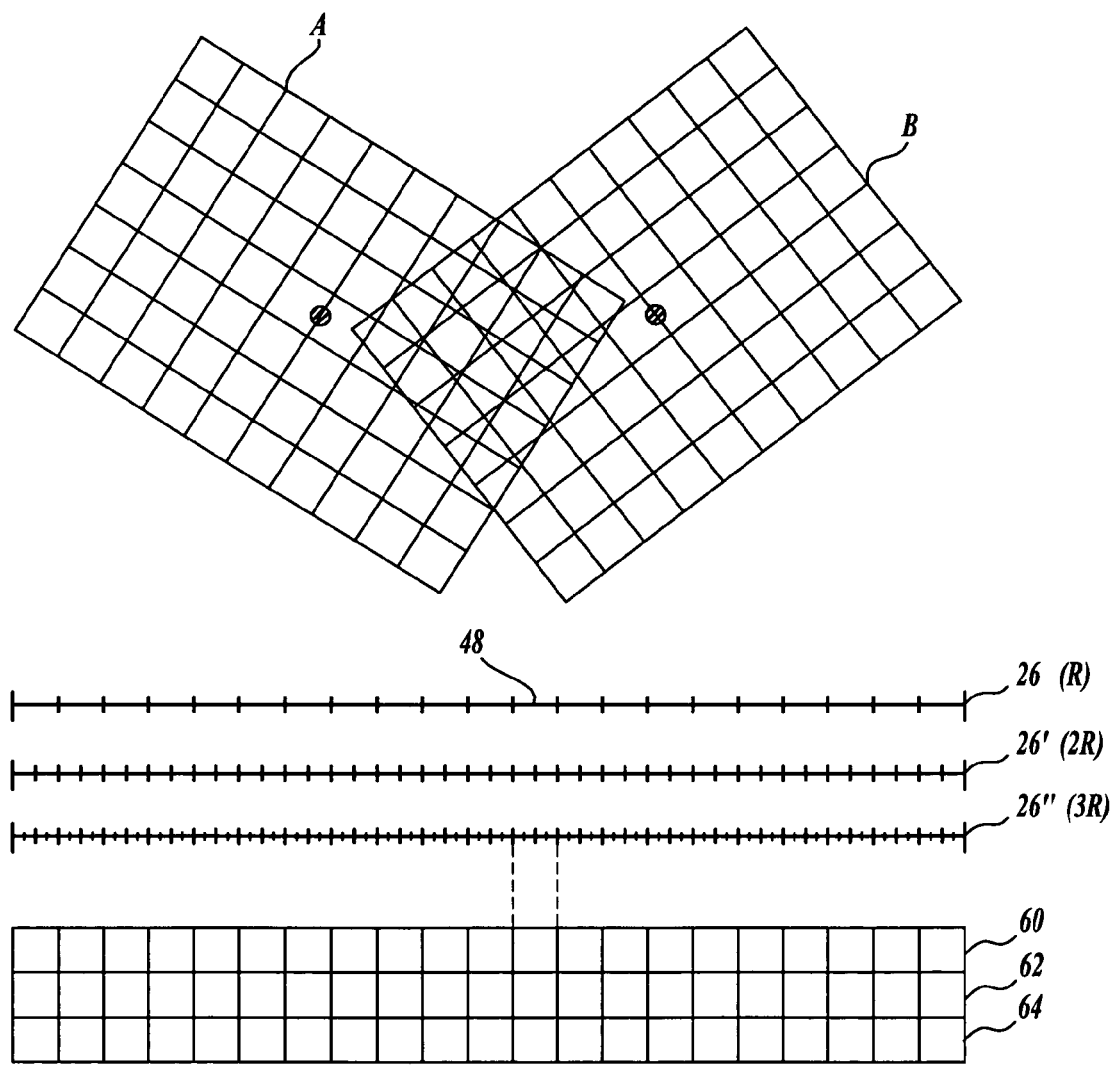
FIG. 10A illustrates the concept of super sampling, which involves virtually dividing each pixel into two or more virtual sub-pixels, to address the issue of aliasing according to one aspect of the present invention.

FIG. 10A schematically illustrates the concept of super sampling. As before, voxel sets A and B are provided to be rendered onto the viewport 26. The viewport 26 consists of a 2D array of pixels, such as the pixel 48. According to the super sampling method, each pixel (e.g., 48) in the viewport 26 having a resolution of R is virtually subdivided into multiple subpixels, such as four virtual subpixels per the original pixel, forming part of a virtual viewport 26' having a higher resolution of 2R. Alternatively, each pixel in the viewport 26 may be virtually divided into nine virtual subpixels, to form part of a virtual viewport 26" having a still higher resolution of 3R. As before, although FIG. 10A is illustrated in 2D for the purpose of clarity, it should be understood by one skilled in the art that voxel sets A and B are actually in 3D and that the viewports 26, 26', and 26" are provided in 2D (extending toward the plane of the paper). Also as before, the z-buffer 60 and the color buffer 62 are provided to store the z value and the shade information of the voxel to be painted onto the pixel associated with the z-buffer and the color buffer, and further the occupancy buffer 64 is provided to indicate whether or not its associated pixel has been painted. Note that each pixel (e.g., 48) is associated with only one z-buffer 60, color buffer 62, and occupancy buffer 64, even though the pixel itself may be divided into two or more virtual subpixels.

Figure 10B:
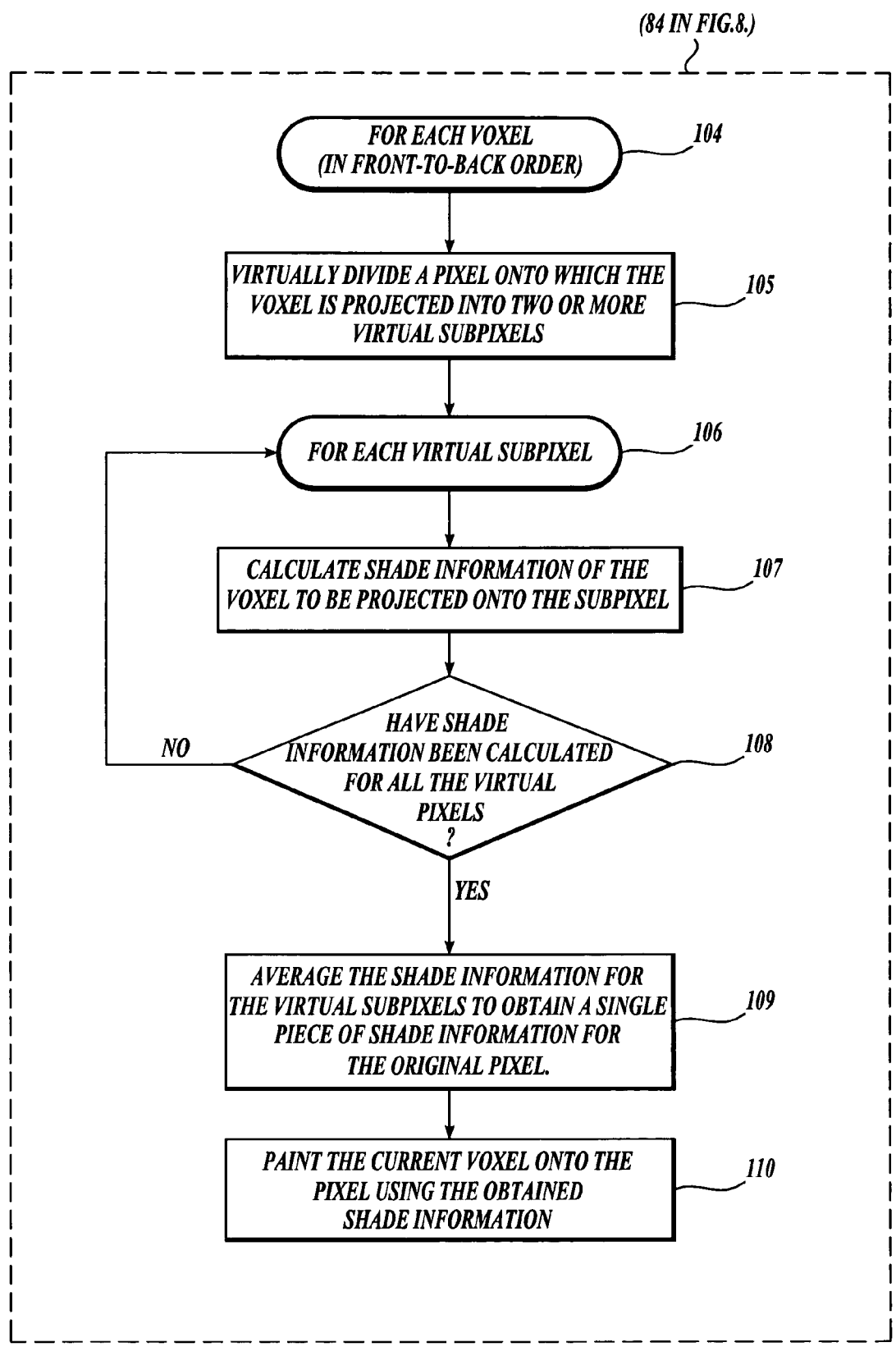
FIG. 10B is a flow chart illustrating a method of anti-aliasing using the super sampling subroutine, according to one aspect of the present invention.

FIG. 10B is a flow chart illustrating a method of anti-aliasing using the super sampling subroutine, according to one aspect of the present invention. When the super sampling subroutine is used, the subroutine as depicted in FIG. 10B replaces the step 84 in FIG. 8. In FIG. 10B, for each voxel in the voxel set, preferably in a front-to-back order (step 104), each pixel onto which the voxel is projected is virtually divided into two or more virtual subpixels (step 105). Then, for each virtual subpixel (step 106), shade information of the voxel to be projected onto the virtual subpixel is calculated (step 107). Next, it is determined whether the shade information for all of the virtual subpixels within the original pixel has been calculated (step 108). If not, the subroutine returns to step 106, and in step 107 the shade information for the next virtual subpixel is calculated. If in step 108 it is determined that the shade information for all of the virtual subpixels has been calculated, then in step 109, the shade information for all of the virtual subpixels is averaged or otherwise generalized to obtain a single piece of shade information for the original pixel. Thereafter, in step 110, the current voxel is painted onto the pixel using the above-obtained single piece of shade information for the pixel.

Figure 10C:
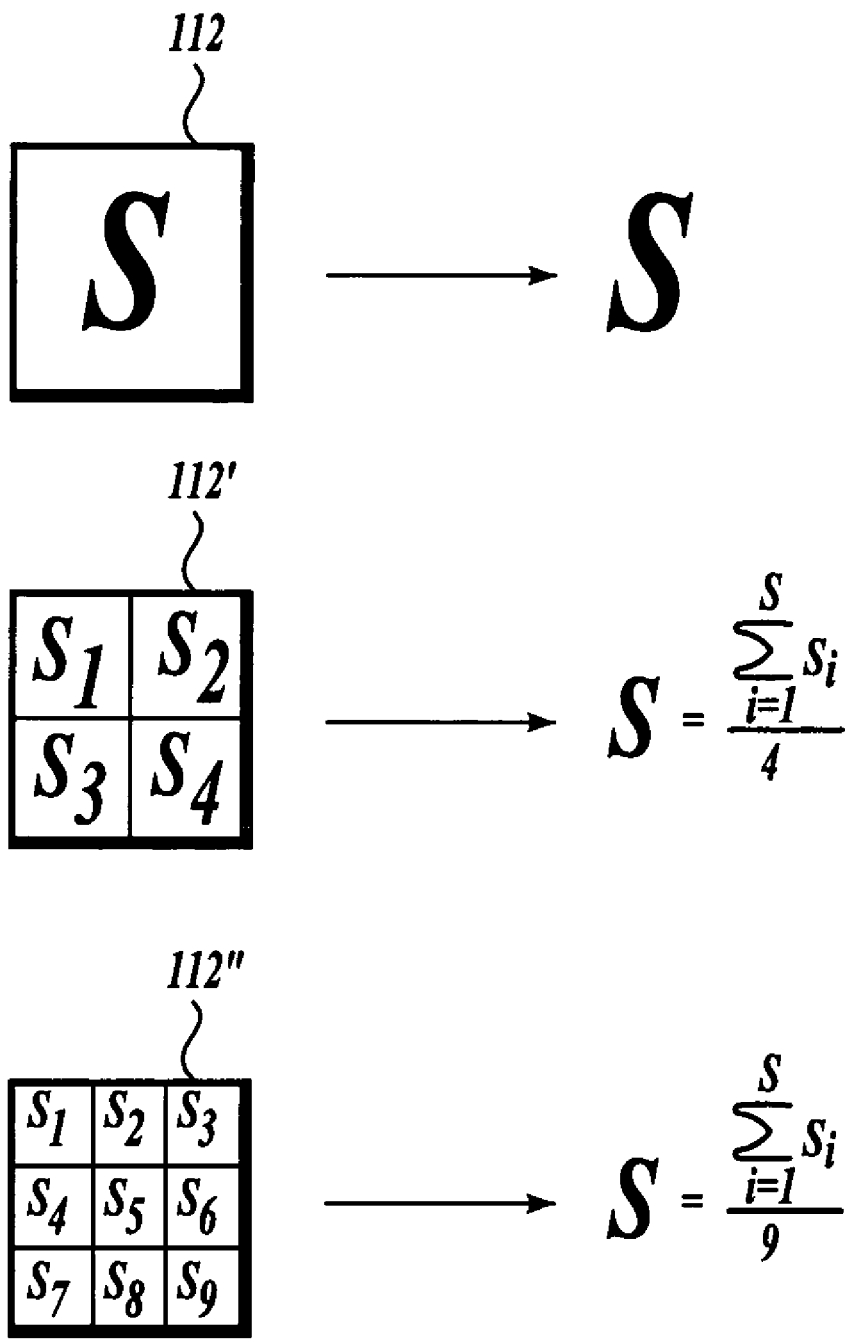
FIG. 10C schematically illustrates examples of super sampling.

FIG. 10C schematically illustrates the averaging process to obtain a single piece of shade information for the original pixel, which is calculated to better represent or approximate the actual edge line across the pixel. If using the shade information S calculated for a pixel 112 in an ordinary manner produces aliased results, then the pixel 112 may be divided into four subpixels (see pixel 112'). Then, the shade information S1–S4 are calculated for the four virtual subpixels, respectively, and S1–S4 are averaged or otherwise generalized to produce a single piece of shade information S. Likewise, it is proposed that even better anti-aliasing results can be achieved by first dividing the pixel into nine virtual subpixels (see pixel 112"), calculating the shade information for those nine subpixels, and averaging or otherwise generalizing the shade information for the nine subpixels.

Accordingly, the super sampling subroutine entails virtually up-sampling the shade information with respect to higher-resolution virtual subpixels, and then down-sampling the shade information calculated for each of the virtual subpixels to obtain a single piece of shade information for the original pixel. It has been found that the super sampling subroutine substantially (i.e., visually recognizably) reduces aliased results in a rendered image.

The second approach for addressing the aliasing issue is alpha blending, involving blending of the alpha values of the front-most voxels of the first several (e.g., two) voxel sets. An alpha value, as known in the art, typically ranges from 0 to 1 to indicate the degree of transparency of a voxel.

Figure 11A:
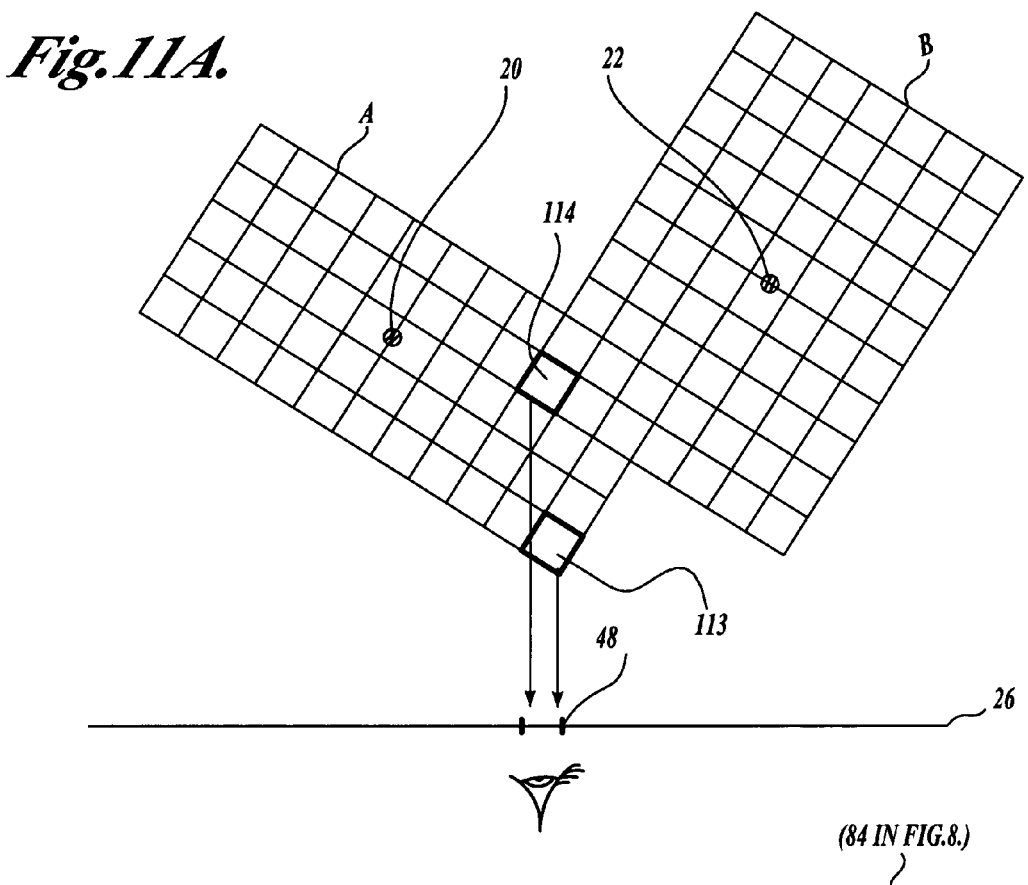
FIG. 11A illustrates a method of blending alpha values of the front-most voxels in the first two voxel sets, to address the issue of aliasing, according to one aspect of the present invention.

FIG. 11A illustrates two voxel sets A and B, wherein voxel set A is presumed to be closer to the viewport 26 than voxel set B based on the positions of their respective midpoints 20 and 22. When using the splatting approach, described above, voxel set A is traversed in a front-to-back order to identify, for example, the front-most voxel 113 to be projected onto the pixel 48. Thereafter, voxel set B may be traversed in a similar manner to identify its front-most voxel 114 to be projected onto the same pixel 48. In the splatting method described above in reference to FIG. 8, only the shade information including the alpha value of the voxel 113 would be used to paint the pixel 48 because the voxel 113 is in front of the voxel 114. In a method involving alpha blending, on the other hand, the alpha values of both of the pixels 113 and 114 are blended (e.g., averaged) and the blended alpha value is used to paint the pixel 48. It has been discovered that the alpha blending method generally reduces the jaggedness or aliasing, which would otherwise result in a rendered image.

Figure 11B:
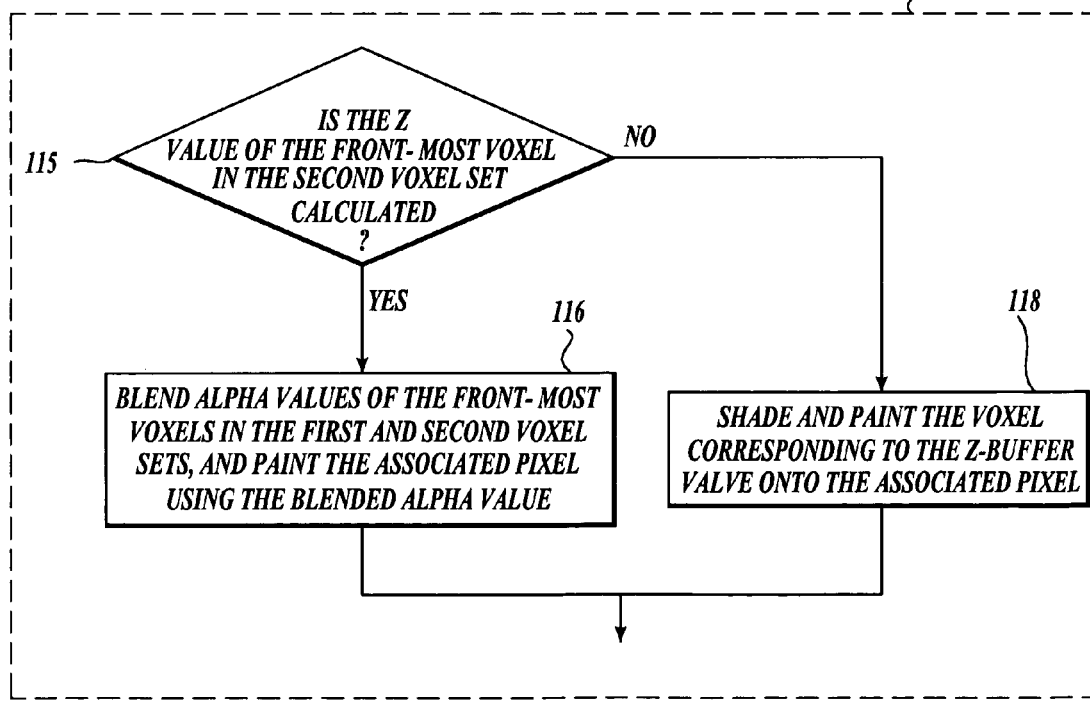
FIG. 11B is a flow chart illustrating a method of anti-aliasing using the alpha blending subroutine, according to one aspect of the present invention.

FIG. 11B is a flowchart illustrating the alpha blending subroutine to address the aliasing issue. When alpha blending is to be used, the subroutine described in FIG. 11B generally replaces the step 84 in FIG. 8. First, in step 115, it is determined whether the z value of the front-most voxel in the second voxel set has been calculated. If so determined, then in step 116, the alpha value of the front-most voxel in the second voxel set is blended with the alpha value of the front-most voxel in the first voxel set, which is previously stored. Then, the associated pixel is painted using the blended alpha value. On the other hand, if it is determined that the z value of the front-most voxel in the second voxel set has not yet been calculated (i.e., only the first voxel set has been considered so far), then in step 118, the voxel corresponding to the z-buffer value (i.e., the front-most voxel in the first voxel set) is shaded and painted onto the associated pixel.

While the above example described blending the alpha values of the front-most voxels from the first two voxel sets, it may be possible to blend the alpha values of the front-most voxels from three or more voxel sets. Also, it is noted that the above-described alpha blending presumes that the front-most voxels of the first two voxel sets to be considered are truly the two front-most voxels. There may be cases, however, where, for example, the front-most voxel of the third voxel set is actually closer to the viewport than the front-most voxel of the second voxel set, and thus the two truly front-most voxels are the front-most voxels of the first and third voxel sets. In general, however, such cases are sufficiently rare, as long as the voxel sets are initially sorted in the presumed order from the closest to farthest away from the viewport, as described above, to render an associated blending error negligible. To further minimize the blending error, in one embodiment, the alpha blending subroutine may be used in combination with the super sampling subroutine described above.

It should be noted that, in general, the super sampling method and the alpha blending method, as described above, can be combined to achieve a result that is even better than what can be achieved using only one approach.

The blending, or averaging, of two alpha values involves considering the coverage percentage of each voxel onto the associated pixel. Specifically, referring back to FIG. 11A, if it is determined that the front-most voxel 113 of the first voxel set A projects onto and covers approximately 100% of the pixel 48, while the front-most voxel 114 of the second voxel set B projects onto and covers approximately 70% of the same pixel 48, then the alpha values of the two voxels 113 and 114 are mixed in the same 100:70 ratio to produce the blended alpha value for the pixel 48.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A splatting method of rendering 3D voxel data including plural voxel sets, using a z-buffer, comprising:
   (a) resetting a z-buffer associated with pixels in a viewport; and
   (b) for each of the plural voxel sets, one voxel set at a time,
      (i) traversing voxels within the voxel set until an occupied voxel is found; and
      (ii) if a z value of the occupied voxel is less than a z value stored in the z-buffer, storing the z value of the occupied voxel in the z-buffer and painting the occupied voxel onto an associated pixel, and returning to step (b)(i), until all voxels in the voxel set have been traversed.

2. The method of claim 1, further comprising the step of sorting the plural voxel sets into an order of presumably closest to the viewport to presumably farthest away from the viewport, prior to step (b).

3. The method of claim 2, wherein the plural voxel sets are sorted based on the locations of their respective midpoints.

4. The method of claim 1, wherein the voxels in each voxel set are traversed in a front-to-back order.

5. The method of claim 4, wherein a z value of the occupied voxel is calculated on the fly using an equation that increments a predefined fixed value.

6. The method of claim 5, wherein the z value of the occupied voxel is calculated using an equation that increments a predefined fixed value by referring to a predefined lookup table.

7. The method of claim 4, wherein the z-buffer is implemented in fixed point coordinates and the z value of the occupied voxel is calculated in fixed point math.

8. The method of claim 1, further comprising the use of an occupancy buffer, the method further comprising the step of resetting the occupancy buffer for each of the plural voxel sets prior to step (b)(i) of traversing voxels within the voxel set,
   wherein step (b)(ii) further comprises:
      (1) if the occupancy buffer indicates that a pixel associated with the occupied voxel has been painted, returning to step (b)(i), until all voxels in the voxel set have been traversed; and
      (2) if the occupancy buffer indicates that a pixel associated with the occupied voxel has not been painted, and if a z value of the occupied voxel is less than a z value stored in the z-buffer, storing the z value of the occupied voxel in the z-buffer and painting the occupied voxel onto an associated pixel, setting the occupancy buffer to indicate the associated pixel as painted, and returning to step (b)(i), until all voxels in the voxel set have been traversed.

9. The method of claim 1, further comprising an anti-aliasing sub-method comprising the steps of:

virtually dividing each pixel on the viewport into two or more virtual subpixels;

calculating shading information of the occupied voxel to be projected onto each of the virtual subpixels, respectively;

averaging the shading information for the two or more virtual subpixels to obtain a single piece of shading information for the original pixel; and using the single piece of shading information to paint the pixel.

10. The method of claim 1, further comprising an anti-aliasing sub-method comprising the steps of:

identifying the front-most voxels of the first two voxel sets, respectively, relative to an associated pixel;

blending alpha values of the two front-most voxels; and using the blended alpha value to paint the associated pixel.

11. A computer-readable medium comprising computable-executable instructions for rendering 3D voxel data including plural voxel sets, using a z-buffer, the computer-executable instructions when loaded onto a computer perform the steps of:

(a) resetting a z-buffer associated with pixels in a viewport; and (b) for each of the plural voxel sets, one voxel set at a time,
  (i) traversing voxels within the voxel set until an occupied voxel is found; and
  (ii) if a z value of the occupied voxel is less than a z value stored in the z-buffer, storing the z value of the occupied voxel in the z-buffer and painting the occupied voxel onto an associated pixel, and returning to step (b)(i), until all voxels in the voxel set have been traversed.

12. The medium of claim 11, further comprising the computer-executable instructions for performing the step of sorting the plural voxel sets into an order of presumably closest to the viewport to presumably farthest away from the viewport, prior to step (b).

13. The medium of claim 12, wherein the plural voxel sets are sorted based on the locations of their respective midpoints.

14. The medium of claim 11, wherein the voxels in each voxel set are traversed in a front-to-back order.

15. The medium of claim 14, wherein a z value of the occupied voxel is calculated on the fly using an equation that increments a predefined fixed value.

16. The medium of claim 15, wherein the z value of the occupied voxel is calculated using an equation that increments a predefined fixed value by referring to a predefined lookup table.

17. The medium of claim 14, wherein the z-buffer is implemented in fixed point coordinates and the z value of the occupied voxel is calculated in fixed point math.

18. The medium of claim 11, further comprising the use of an occupancy buffer, the medium further comprising computer-executable instructions for performing the step of resetting the occupancy buffer for each of the plural voxel sets prior to step (b)(i) of traversing voxels within the voxel set, wherein step (b)(ii) further comprises:

(1) if the occupancy buffer indicates that a pixel associated with the occupied voxel has been painted, returning to step (b)(i), until all voxels in the voxel set have been traversed; and (2) if the occupancy buffer indicates that a pixel associated with the occupied voxel has not been painted, and if a z value of the occupied voxel is less than a z value stored in the z-buffer, storing the z value of the occupied voxel in the z-buffer and painting the occupied voxel onto an associated pixel, setting the occupancy buffer to indicate the associated pixel as painted, and returning to step (b)(i), until all voxels in the voxel set have been traversed.

19. The medium of claim 11, further comprising computer-executable instructions for performing an anti-aliasing subroutine comprising the steps of:

virtually dividing each pixel on the viewport into two or more virtual subpixels;

calculating shading information of the occupied voxel to be projected onto each of the virtual subpixels, respectively;

averaging the shading information for the two or more virtual subpixels to obtain a single piece of shading information for the original pixel; and using the single piece of shading information to paint the pixel.

20. The medium of claim 11, further comprising computer-executable instructions for performing an anti-aliasing subroutine comprising the steps of:

identifying the front-most voxels of the first two voxel sets, respectively, relative to an associated pixel;

blending alpha values of the two front-most voxels; and using the blended alpha value to paint the associated pixel.

21. A system for rendering 3D voxel data including plural voxel sets, the system comprising:

a memory for storing the 3D voxel data to be rendered;

a z-buffer for storing z values of voxels to be painted onto pixels on a viewport;

a processing unit coupled to the memory and the z-buffer, the processing unit executing program code for rendering the 3D voxel data by performing the steps of:

(a) resetting the z-buffer associated with the pixels on the viewport; and (b) for each of the plural voxel sets, one voxel set at a time,
  (i) traversing voxels within the voxel set until an occupied voxel is found; and
  (ii) if a z value of the occupied voxel is less than a z value stored in the z-buffer, storing the z value of the occupied voxel in the z-buffer and painting the occupied voxel onto an associated pixel, and returning to step (b)(i), until all voxels in the voxel set have been traversed.

* * * * *

UNITED STATES PATENT AND TRADEMARK OFFICE
CERTIFICATE OF CORRECTION

| | | |
|---|---|---|
| PATENT NO. | : 7,218,323 B1 | Page 1 of 1 |
| APPLICATION NO. | : 10/918024 | |
| DATED | : May 15, 2007 | |
| INVENTOR(S) | : P. A. Halmshaw et al. | |

It is certified that error appears in the above-identified patent and that said Letters Patent is hereby corrected as shown below:

On the title page item (73)   Assignee   "Ngrain (Canada) Corporation," should read --NGRAIN (Canada) Corporation,--

Signed and Sealed this

Twenty-eighth Day of July, 2009

JOHN DOLL
*Acting Director of the United States Patent and Trademark Office*